(12) United States Patent
Takahashi et al.

(10) Patent No.: US 11,432,977 B2
(45) Date of Patent: Sep. 6, 2022

(54) POWER ASSIST WHEELCHAIR, POWER ASSIST UNIT FOR WHEELCHAIR, CONTROL DEVICE FOR POWER ASSIST WHEELCHAIR, CONTROL METHOD FOR POWER ASSIST WHEELCHAIR, AND PROGRAM

(71) Applicants: Hisashi Takahashi, Kanagawa (JP); YAMAHA HATSUDOKI KABUSHIKI KAISHA, Iwata (JP)

(72) Inventors: Hisashi Takahashi, Kanagawa (JP); Tatsuki Uemura, Shizuoka (JP); Masamitsu Mizuno, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 243 days.

(21) Appl. No.: 16/624,933

(22) PCT Filed: Jun. 26, 2017

(86) PCT No.: PCT/JP2017/023353
§ 371 (c)(1),
(2) Date: Dec. 20, 2019

(87) PCT Pub. No.: WO2019/003260
PCT Pub. Date: Jan. 3, 2019

(65) Prior Publication Data
US 2021/0338499 A1 Nov. 4, 2021

(51) Int. Cl.
*A61G 5/04* (2013.01)
*B60L 15/20* (2006.01)
(Continued)

(52) U.S. Cl.
CPC .............. *A61G 5/048* (2016.11); *A61G 5/02* (2013.01); *A61G 5/04* (2013.01); *B60L 15/20* (2013.01);
(Continued)

(58) Field of Classification Search
CPC .......... A61G 5/02; A61G 5/021; A61G 5/023; A61G 5/04; A61G 5/048; B62M 6/45;
(Continued)

(56) References Cited

U.S. PATENT DOCUMENTS 5,818,189 A * 10/1998 Uchiyama .............. A61G 5/048
318/488
5,971,090 A * 10/1999 Tanaka ..................... B62M 6/60
180/220

(Continued)

FOREIGN PATENT DOCUMENTS

JP 05-310175 A 11/1993
JP 09-86476 A 3/1997
(Continued)

OTHER PUBLICATIONS

EPO machine translation of JP 09-86476 (original JP document published Mar. 31, 1997) (Year: 1997).*
(Continued)

*Primary Examiner* — David A Testardi
(74) *Attorney, Agent, or Firm* — Keating & Bennett, LLP

(57) ABSTRACT

A power assist wheelchair includes a wheel, an electric motor that drives the wheel, an encoder that detects rotation of the electric motor, and a control device that controls the electric motor. The control device includes a total torque value calculator that calculates a total torque value based upon only a detection signal of the encoder, an assist torque value calculator that calculates an assist torque value based upon an output current of the electric motor, a manual torque
(Continued)

value calculator that calculates a manual torque value based upon a difference obtained by subtracting the assist torque value from the total torque value, and a target current determiner that determines a target current of the electric motor based upon the manual torque value.

4 Claims, 16 Drawing Sheets

(51) Int. Cl.
*A61G 5/02* (2006.01)
*B62M 6/50* (2010.01)
(52) U.S. Cl.
CPC ............ *B62M 6/50* (2013.01); *B60L 2200/24* (2013.01); *B60L 2200/34* (2013.01); *B60L 2240/421* (2013.01); *B60L 2240/423* (2013.01); *B60L 2240/429* (2013.01)
(58) Field of Classification Search
CPC ........... B62M 6/50; B60L 15/20; B60L 15/30; B60L 50/20; B60L 2200/24; B60L 2240/12; B60L 2240/421; B60L 2240/423; B60L 2200/34
See application file for complete search history.

(56) References Cited

U.S. PATENT DOCUMENTS

| | | | | |
|---|---|---|---|---|
| 6,354,390 | B1* | 3/2002 | Uchiyama | A61G 5/045 180/65.1 |
| 2002/0019686 | A1* | 2/2002 | Ulrich | B60K 7/0007 701/55 |
| 2004/0206563 | A1* | 10/2004 | Murata | B62M 6/45 180/206.2 |
| 2006/0066268 | A1* | 3/2006 | Noro | B60L 15/2036 318/69 |
| 2006/0095191 | A1* | 5/2006 | Lin | B62M 6/50 701/84 |
| 2011/0015842 | A1* | 1/2011 | Kume | B62B 5/0026 701/67 |
| 2017/0196742 | A1* | 7/2017 | Wu | B62M 6/40 |
| 2018/0185211 | A1 | 7/2018 | Uemura | |
| 2018/0257740 | A1* | 9/2018 | Kikkawa | B62B 5/0073 |
| 2018/0271725 | A1* | 9/2018 | Kita | B60W 30/18109 |
| 2020/0156482 | A1* | 5/2020 | Savaresi | B62B 5/06 |
| 2020/0253798 | A1* | 8/2020 | Mizuno | A61G 5/048 |

FOREIGN PATENT DOCUMENTS

| | | | | |
|---|---|---|---|---|
| JP | 09086476 A | * | 3/1997 | |
| JP | 09248318 A | * | 9/1997 | |
| JP | 09248319 A | * | 9/1997 | |
| JP | 2004-025913 A | | 1/2004 | |
| JP | 2004025913 A | * | 1/2004 | .............. B62M 6/50 |
| JP | 2004-113375 A | | 4/2004 | |
| JP | 2004-120875 A | | 4/2004 | |
| JP | 2005153648 A | * | 6/2005 | .............. B62M 6/50 |
| JP | 2006-230421 A | | 9/2006 | |
| JP | 2006230421 A | * | 9/2006 | |
| JP | 2007-223579 A | | 9/2007 | |
| KR | 10-2014-0065291 A | | 5/2014 | |
| KR | 20140065291 A | * | 5/2014 | |
| WO | 2017/037898 A1 | | 3/2017 | |
| WO | 2017/047333 A1 | | 3/2017 | |
| WO | WO-2017047333 A1 | * | 3/2017 | .......... B60W 30/188 |
| WO | WO-2017068621 A | * | 4/2017 | ............ B60W 10/08 |

OTHER PUBLICATIONS

JPO machine translation of JP 2004-25913 (original JP document published Jan. 29, 2004) (Year: 2004).*
Petersson, Daniel et al., "Torque Sensor Free Power Assisted Wheelchair", Proceedings of the 2007 IEEE 10th International Conference on Rehabilitation Robotics, Jun. 12-15, Noordwijk, The Netherlands, pp. 151-157 (Year: 2007).*
EPO machine translation of KR 20140065291 (original KR document published May 29, 2014) (Year: 2014).*
KIPO machine translation of KR 1020140065291 (original KR document published May 29, 2014) (Year: 2014).*
English translation of Official Communication issued in International Patent Application No. PCT/JP2017/023353, dated Aug. 22, 2017.
Official Communication issued in International Patent Application No. PCT/JP2017/023353, dated Aug. 22, 2017.

* cited by examiner

POWER ASSIST WHEELCHAIR, POWER ASSIST UNIT FOR WHEELCHAIR, CONTROL DEVICE FOR POWER ASSIST WHEELCHAIR, CONTROL METHOD FOR POWER ASSIST WHEELCHAIR, AND PROGRAM

BACKGROUND OF THE INVENTION

1. Field of the Invention

The present disclosure relates to a power assist wheelchair, a power assist unit for a wheelchair, a control device for a power assist wheelchair, a control method for a power assist wheelchair, and a program.

2. Description of the Related Art

Known is a power assist wheelchair driven by combining power of an occupant rowing a hand rim by hand and power of an electric motor. In JP 2006-230421 A, it is described that manual torque provided to a wheelchair by a person is estimated based upon an acceleration sensor, compensation torque is obtained by the manual torque and assist magnification, and the compensation torque is converted into a compensation current, thus controlling a motor current.

Meanwhile, in a case where the acceleration sensor is provided in the wheelchair as described in JP 2006-230421 A, since an output value changes depending on a position where the acceleration sensor is provided, it is difficult to accurately estimate the manual torque. Such a problem is particularly noticeable when a unit for power assist is retrofitted into the wheelchair.

SUMMARY OF THE INVENTION

Preferred embodiments of the present invention estimate a manual torque with a simple hardware configuration.

According to a preferred embodiment of the present invention, a power assist wheelchair includes a wheel; an electric motor that drives the wheel; an encoder that detects rotation of the electric motor; and a control device that controls the electric motor. The control device includes a total torque value calculator that calculates a total torque value based upon only a detection signal of the encoder; an assist torque value calculator that calculates an assist torque value based upon an output current of the electric motor; a manual torque value calculator that calculates a manual torque value based upon a difference obtained by subtracting the assist torque value from the total torque value; and a target current determiner that determines a target current of the electric motor based upon the manual torque value. Accordingly, since the total torque value is calculated based upon only the detection signal of the encoder and then the manual torque value is calculated, the manual torque is able to be estimated with a simple hardware configuration.

In an example of the power assist wheelchair, the total torque value and the assist torque value may be calculated as torque acting on an output shaft of the electric motor. Accordingly, the manual torque is more easily estimated.

In an example of the power assist wheelchair, the total torque value and the assist torque value may be calculated as torque acting on the wheel. Accordingly, the manual torque is more easily estimated.

In an example of the power assist wheelchair, the manual torque value may be calculated as torque acting on the wheel. Accordingly, the manual torque acting on the wheel is able to be estimated.

In an example of the power assist wheelchair, the target current determiner may calculate a target torque value of the electric motor by multiplying the manual torque value converted from the torque acting on the wheel into the torque acting on the output shaft of the electric motor by a predetermined assist ratio. Accordingly, the target torque value of the electric motor is able to be calculated from the estimated manual torque acting on the wheel.

According to a preferred embodiment of the present invention, a power assist wheelchair includes a wheel; an electric motor that drives the wheel; an encoder that detects rotation of the electric motor; and a control device that controls the electric motor. The control device includes a total torque value calculator that calculates a total torque value based upon a detection signal of the encoder; a twist torque value calculator that calculates a twist torque value representing torque causing twist of the wheel with respect to an axle; a manual torque value calculator that calculates a manual torque value based upon a difference obtained by subtracting the twist torque value from the total torque value; and a target current determiner that determines a target current of the electric motor based upon the manual torque value. Accordingly, the manual torque is able to be estimated in consideration of the twist of the wheel with respect to the axle.

In an example of the power assist wheelchair, the total torque value calculator may calculate the total torque value based upon a difference obtained by subtracting a twist angular velocity value representing an angular velocity of the twist from an angular velocity value calculated based upon the detection signal of the encoder. Accordingly, the total torque value is more accurately calculated.

In an example of the power assist wheelchair, the twist angular velocity value may be calculated based upon the twist torque value. Accordingly, the total torque value is able to be calculated by using the twist torque value.

In an example of the power assist wheelchair, the twist torque value calculator may calculate the twist torque value based upon a difference obtained by subtracting an assist torque value calculated based upon an output current of the electric motor from a torque value calculated based upon the detection signal of the encoder. Accordingly, the twist torque value is able to be calculated based upon the detection signal of the encoder and the output current of the electric motor.

According to a preferred embodiment of the present invention, a power assist wheelchair includes first and second wheels spaced apart from each other in a vehicle width direction; a first electric motor that drives the first wheel; a first encoder that detects rotation of the first electric motor; a second electric motor that drives the second wheel; a second encoder that detects rotation of the second electric motor; and a control device that controls the first and second electric motors. The control device includes a first total torque value calculator that calculates a first total torque value based upon only a detection signal of the first encoder; a first assist torque value calculator that calculates a first assist torque value based upon an output current of the first electric motor; a first manual torque value calculator that calculates a first manual torque value based upon a difference obtained by subtracting the first assist torque value from the first total torque value; a first target current determiner that determines a target current of the first electric motor based upon the first manual torque value; a second total torque value calculator that calculates a second total torque value based upon only a detection signal of the second encoder; a second assist torque value calculator that calculates a second assist torque value based upon an output current of the second electric motor; a second manual torque value calculator that calculates a second manual torque value based upon a difference obtained by subtracting the second assist torque value from the second total torque value; and a second target current determiner that determines a target current of the second electric motor based upon the second manual torque value. Accordingly, with respect to each of the first and second wheels, since the total torque value is calculated based upon only the detection signal of the encoder and then the manual torque value is calculated, the manual torque is able to be estimated with a simple hardware configuration.

In an example of the power assist wheelchair, the first target current determiner may determine the target current of the first electric motor based upon the first manual torque value and the second manual torque value, and the second target current determiner may determine the target current of the second electric motor based upon the first manual torque value and the second manual torque value. Accordingly, the target torque value of the electric motor is able to be calculated also in consideration of another manual torque.

In an example of the power assist wheelchair, the first and second target current determiners may respectively calculate the target currents of the first and second electric motors based upon a value obtained by multiplying a sum of the first manual torque value and the second manual torque value by a predetermined straight-ahead assist ratio. Accordingly, the straightness of driving the wheelchair is able to be controlled.

In an example of the power assist wheelchair, the first and second target current determiners may respectively calculate the target currents of the first and second electric motors based upon a value obtained by multiplying a difference between the first manual torque value and the second manual torque value by a predetermined turn assist ratio. Accordingly, the turnability of the wheelchair is able to be controlled.

In an example of the power assist wheelchair, the first and second target current determiners may respectively calculate the target currents of the first and second electric motors based upon a value obtained by multiplying a sum of the first manual torque value and the second manual torque value by a predetermined straight-ahead assist ratio, and a value obtained by multiplying a difference between the first manual torque value and the second manual torque value by a predetermined turn assist ratio. Accordingly, the straightness and the turnability of the wheelchair is able to be controlled.

In an example of the power assist wheelchair, the straight-ahead assist ratio may be greater than the turn assist ratio. Accordingly, the straightness of driving the wheelchair is improved.

In an example of the power assist wheelchair, the turn assist ratio may be greater than the straight-ahead assist ratio. Accordingly, the turnability of the wheelchair is improved.

According to a preferred embodiment of the present invention, a power assist unit for a wheelchair includes a wheel; an electric motor that drives the wheel; an encoder that detects rotation of the electric motor; and a control device that controls the electric motor. The control device includes a total torque value calculator that calculates a total torque value based upon only a detection signal of the encoder; an assist torque value calculator that calculates an assist torque value based upon an output current of the electric motor; a manual torque value calculator that calculates a manual torque value based upon a difference obtained by subtracting the assist torque value from the total torque value; and a target current determiner that determines a target current of the electric motor based upon the manual torque value. Accordingly, since the total torque value is calculated based upon only the detection signal of the encoder and then the manual torque value is calculated, the manual torque is able to be estimated with a simple hardware configuration.

According to a preferred embodiment of the present invention, a control device for a power assist wheelchair including a wheel, an electric motor that drives the wheel, and an encoder that detects rotation of the electric motor includes a total torque value calculator that calculates a total torque value based upon only a detection signal of the encoder; an assist torque value calculator that calculates an assist torque value based upon an output current of the electric motor; a manual torque value calculator that calculates a manual torque value based upon a difference obtained by subtracting the assist torque value from the total torque value; and a target current determiner that determines a target current of the electric motor based upon the manual torque value. Accordingly, since the total torque value is calculated based upon only the detection signal of the encoder and then the manual torque value is calculated, the manual torque is able to be estimated with a simple hardware configuration.

According to a preferred embodiment of the present invention, a control method for a power assist wheelchair including a wheel, an electric motor that drives the wheel, and an encoder that detects rotation of the electric motor includes calculating a total torque value based upon only a detection signal of the encoder; calculating an assist torque value based upon an output current of the electric motor; calculating a manual torque value based upon a difference obtained by subtracting the assist torque value from the total torque value; and determining a target current of the electric motor based upon the manual torque value. Accordingly, since the total torque value is calculated based upon only the detection signal of the encoder and then the manual torque value is calculated, the manual torque is able to be estimated with a simple hardware configuration.

According to a preferred embodiment of the present invention, a non-transitory computer readable medium includes a program that causes a computer of a control device for a power assist wheelchair including a wheel, an electric motor that drives the wheel, and an encoder that detects rotation of the electric motor to function as a total torque value calculator that calculates a total torque value based upon only a detection signal of the encoder; an assist torque value calculator that calculates an assist torque value based upon an output current of the electric motor; a manual torque value calculator that calculates a manual torque value based upon a difference obtained by subtracting the assist torque value from the total torque value; and a target current determiner that determines a target current of the electric motor based upon the manual torque value. Accordingly, since the total torque value is calculated based upon only the detection signal of the encoder and then the manual torque value is calculated, the manual torque is able to be estimated with a simple hardware configuration.

According to preferred embodiments of the present invention, since a total torque value is calculated based upon only a detection signal of an encoder and then a manual torque value is calculated, the manual torque is able to be estimated with a simple hardware configuration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
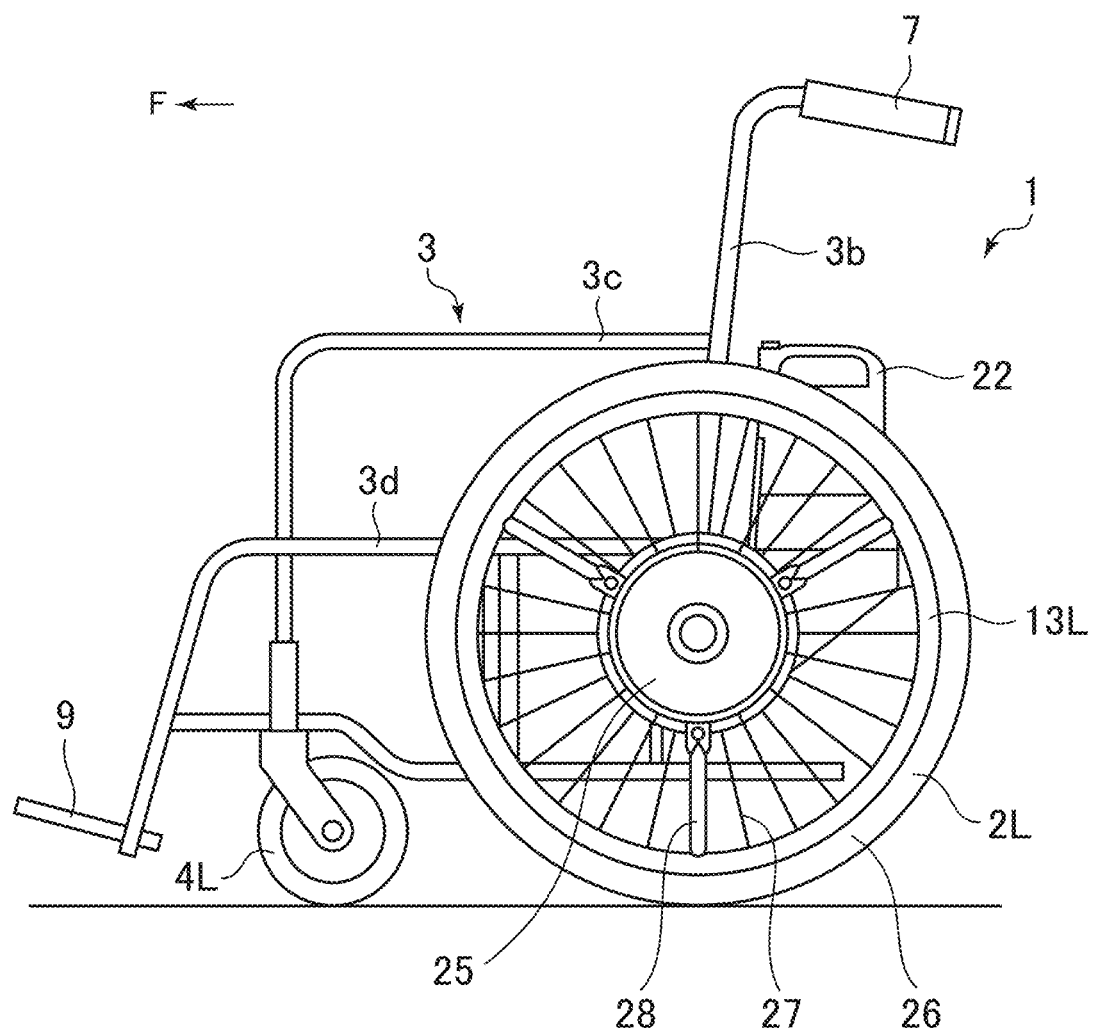
FIG. 1 is a left side view illustrating a power assist wheelchair according to a preferred embodiment of the present invention.
Figure 2:
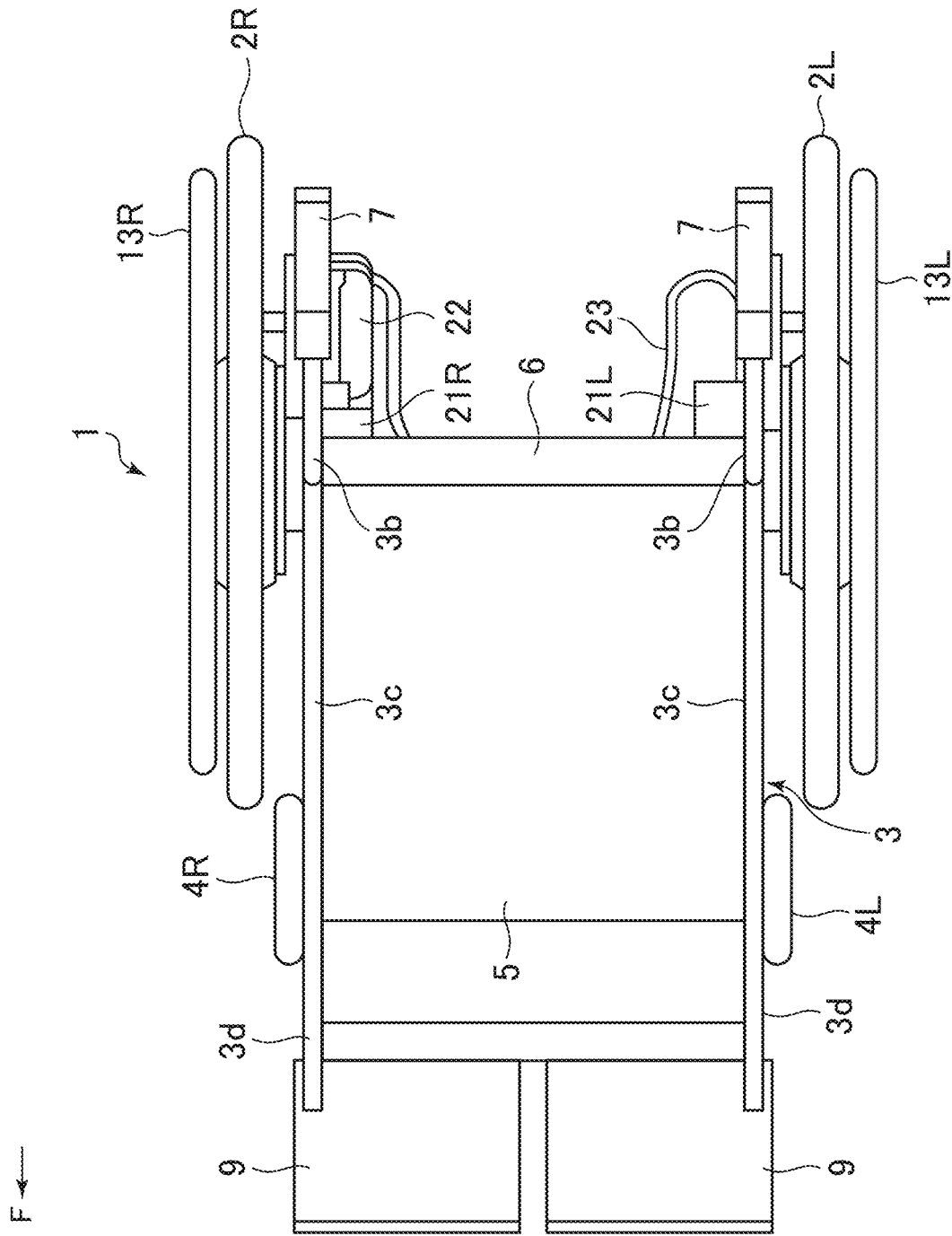
FIG. 2 is a plan view illustrating the power assist wheelchair.

FIGS. 1 and 2 are a left side view and a plan view illustrating a power assist wheelchair 1 (hereinafter also abbreviated as a "wheelchair 1") according to a preferred embodiment of the present invention. In the specification, a forward direction, a backward direction, an upward direction, a downward direction, a left direction, and a right direction indicate a forward direction, a backward direction, an upward direction, a downward direction, a left direction, and a right direction when viewed from an occupant seated on a seat 5 of the wheelchair 1. The left and right direction is also referred to as a vehicle width direction. Arrows F in FIG. 1 and FIG. 2 represent the forward direction.

The wheelchair 1 includes a vehicle body frame 3 made of metal pipes and the like. A pair of left and right wheels 2L and 2R and a pair of left and right casters 4L and 4R are rotatably supported on the vehicle body frame 3. The vehicle body frame 3 includes a pair of left and right back frames 3b, a pair of left and right armrests 3c, and a pair of left and right seat frames 3d.

The seat frame 3d extends in the forward direction from the vicinity of the axles of the wheels 2L and 2R, and the seat 5 for seating an occupant is provided between the seat frames 3d. A front portion of the seat frame 3d is bent in the downward direction, and a footrest 9 is provided at a front lower end of the seat frame 3d.

A rear end of the seat frame 3d is connected to the back frame 3b. The back frame 3b extends in the upward direction, and a back support 6 is provided between the back frames 3b. An upper portion of the back frame 3b is bent in the backward direction, and a hand grip 7 for a helper is provided.

The armrest 3c is disposed in the upward direction of the seat frame 3d. A rear end of the armrest 3c is connected to the back frame 3b. A front portion of the armrest 3c is bent in the downward direction, and is connected to the seat frame 3d.

The wheels 2L and 2R include a disk-shaped hub 25 including the axle, an outer peripheral portion 26 surrounding the hub 25, and a plurality of radially extending spokes 27 interposed between the hub 25 and the outer peripheral portion 26. The outer peripheral portion 26 includes a rim to which the spoke 27 is connected, and a tire mounted on the rim.

The wheelchair 1 includes hand rims 13L and 13R for manually driving the wheels 2L and 2R, respectively. The hand rims 13L and 13R are annularly shaped and have smaller diameters than those of the wheels 2L and 2R, and are connected to a plurality of connection pipes 28 radially extending from the hub 25.

Further, the wheelchair 1 also includes electric motors 21L and 21R for respectively driving the wheels 2L and 2R. The electric motors 21L and 21R are, for example, a brushless DC motor or an AC servo motor, and include encoders 24L and 24R (refer to FIG. 3) for detecting rotation.

Specifically, the left hand rim 13L is disposed on the outside in the vehicle width direction with respect to the left wheel 2L. The occupant of the wheelchair 1 manually drives the left wheel 2L by rotating the left hand rim 13L. Further, the left electric motor 21L is disposed on the inside in the vehicle width direction with respect to the left wheel 2L. The left wheel 2L rotates integrally with the left electric motor 21L. The left electric motor 21L may be coaxially provided with the left wheel 2L, or may be connected thereto via a gear.

In the same manner, the right hand rim 13R is disposed on the outside in the vehicle width direction with respect to the right wheel 2R. The occupant of the wheelchair 1 manually drives the right wheel 2R by rotating the right hand rim 13R. Further, the right electric motor 21R is disposed on the inside in the vehicle width direction with respect to the right wheel 2R. The right wheel 2R rotates integrally with the right electric motor 21R. The right electric motor 21R may be coaxially provided with the right wheel 2R, or may be connected thereto via a gear.

Figure 3:
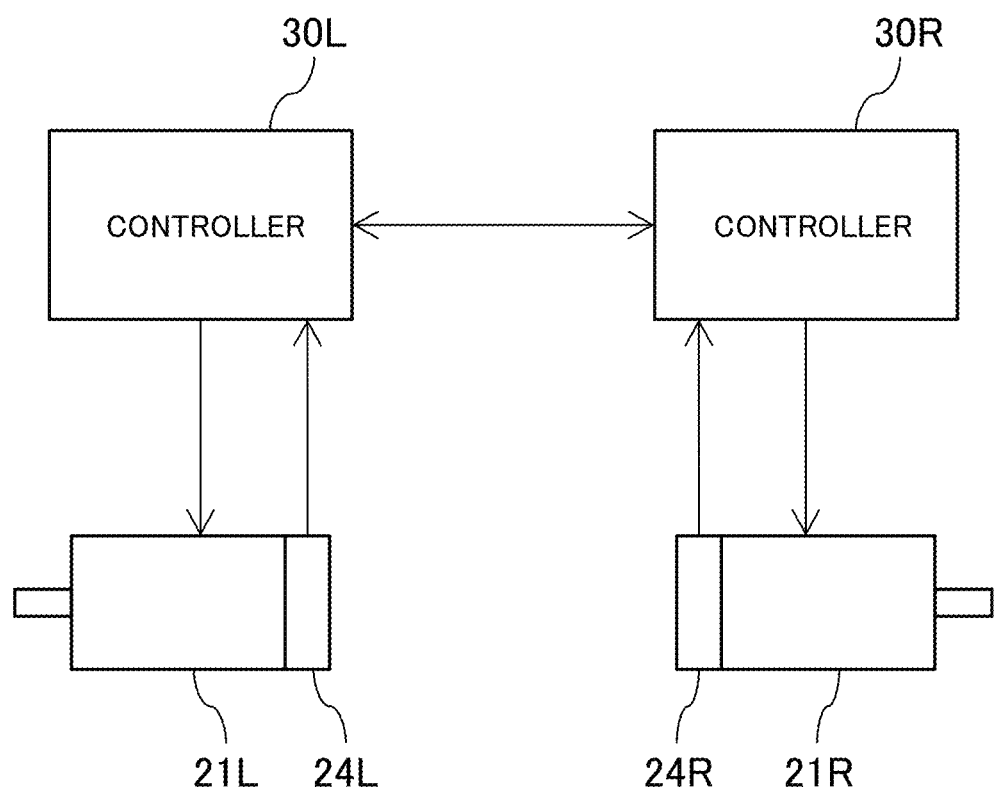
FIG. 3 is a block diagram illustrating a control device for the power assist wheelchair according to a preferred embodiment of the present invention.

As illustrated in FIG. 3, the wheelchair 1 includes controllers 30L and 30R that respectively control the electric motors 21L and 21R. In this example, two controllers 30L and 30R that respectively control the electric motors 21L and 21R are provided as a control device according to a preferred embodiment of the present invention, but this example is not limited thereto, and one controller that controls both electric motors 21L and 21R may be provided.

Specifically, the left encoder 24L provided in the left electric motor 21L detects the rotation of the left electric motor 21L, and outputs a detection signal corresponding to the rotation to the left controller 30L. The left controller 30L determines a target current of the left electric motor 21L based upon the detection signal of the left encoder 24L, and controls a current to be outputted to the left electric motor 21L so that the target current flows. Accordingly, an assist torque to be outputted by the left electric motor 21L is adjusted.

In the same manner, the right encoder 24R provided in the right electric motor 21R detects the rotation of the right electric motor 21R, and outputs a detection signal corresponding to the rotation to the right controller 30R. The right controller 30R determines a target current of the right electric motor 21R based upon the detection signal of the right encoder 24R, and controls a current to be outputted to the right electric motor 21R so that the target current flows.

Accordingly, an assist torque to be outputted by the right electric motor 21R is adjusted.

The controllers 30L and 30R respectively include a microprocessor and a storage, and the microprocessor executes processes according to a program stored in the storage. The storage includes a main storage (for example, a RAM) and an auxiliary storage (for example, a non-volatile semiconductor memory). The program is loaded in the storage via an information storage medium or a communication line.

The controllers 30L and 30R respectively include a motor driver, an AD converter, a communication interface in addition to the microprocessor and the storage. The left controller 30L and the right controller 30R transmit and receive information to and from each other by communication using, for example, a CAN (Controller Area Network).

A battery 22 that supplies electric power to the electric motors 21L and 21R and the controllers 30L and 30R is mounted on the wheelchair 1. In this example, the battery 22 is detachably disposed at the right rear portion of the vehicle body frame 3. Further, the wheelchair 1 includes a cable 23 including a feed line and a communication line extending in the left and right direction in the rear direction of the back support 6.

In this example, the electric power is directly supplied from the battery 22 to the right electric motor 21R and the right controller 30R, and the electric power is supplied from the battery 22 to the left electric motor 21L and the left controller 30L via the cable 23. Further, the left controller 30L and the right controller 30R transmit and receive the information to and from each other via the communication line included in the cable 23.

The wheelchair 1 includes a power assist unit 10 for the wheelchair (hereinafter also abbreviated as a "unit 10") according to a preferred embodiment and is attachable to and detachable from the vehicle body frame 3. The unit 10 includes the wheels 2L and 2R, the hand rims 13L and 13R, the electric motors 21L and 21R, the encoders 24L and 24R, and the controllers 30L and 30R. Further, the unit 10 also includes the battery 22 and the cable 23.

The unit 10 may also be attached to and detached from a vehicle body frame different from the vehicle body frame 3. For example, it is possible to change a general wheelchair into the power assist wheelchair 1 by removing the wheels from the vehicle body frame of the general wheelchair and by mounting the unit 10 on the vehicle body frame thereof.

Hereinafter, the control of the electric motors 21L and 21R by the controllers 30L and 30R will be specifically described. Further, in the following description, the wheels 2L and 2R are collectively referred to as the "wheel 2"; the hand rims 13L and 13R are collectively referred to as the "hand rim 13"; the electric motors 21L and 21R are collectively referred to as the "electric motor 21"; the encoders 24L and 24R are collectively referred to as the "encoder 24"; and the controllers 30L and 30R are collectively referred to as the "controller 30".

Figure 4:
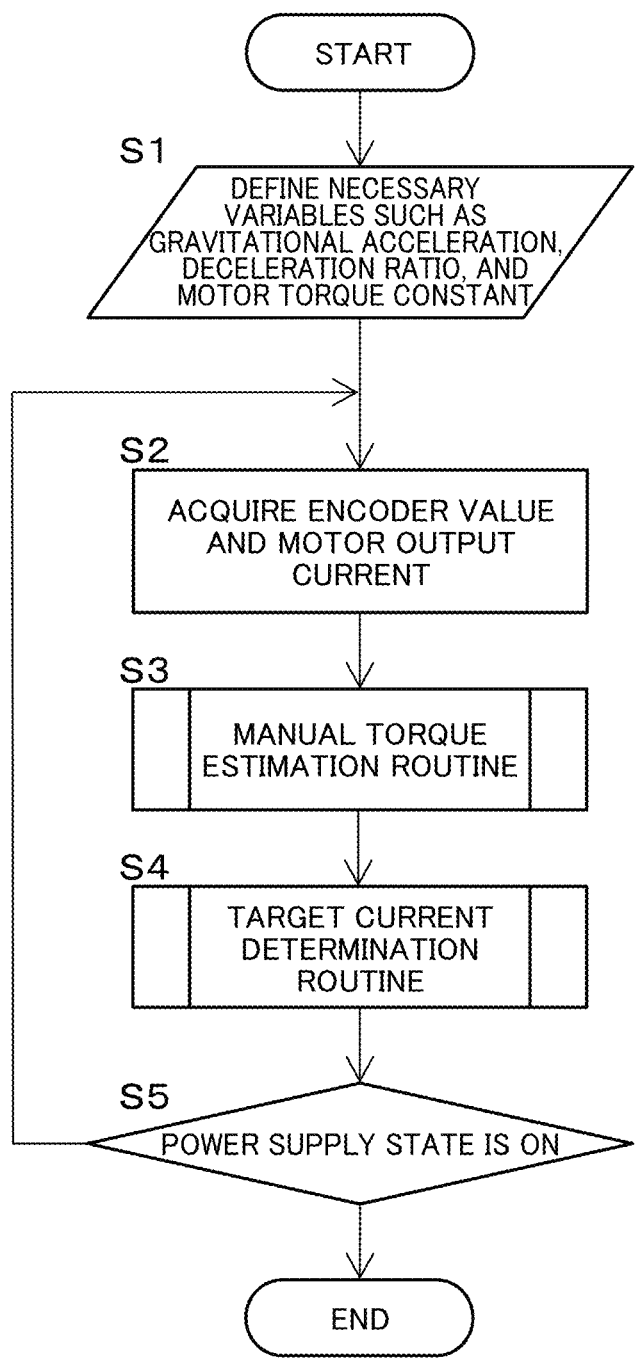
FIG. 4 is a flowchart illustrating a control method for the power assist wheelchair according to a preferred embodiment of the present invention.

FIG. 4 is a flowchart illustrating a control method according to a preferred embodiment of the present invention. The controller 30 implements a control method illustrated in FIG. 4 in such a manner that the microprocessor executes the processes according to the program stored in the storage.

First, the controller 30 defines necessary variables such as a gravitational acceleration, a deceleration ratio, and a motor torque constant (S1). Specifically, the controller 30 reads out a value corresponding to each variable from the storage, and inputs the read value to each variable.

Next, the controller 30 acquires an encoder value and a motor output current (S2). The encoder value is a value of the detection signal of the encoder 24 representing the rotation of the electric motor 21. The motor output current is an amount of current outputted from the controller 30 to the electric motor 21.

Next, the controller 30 executes a manual torque estimation routine that estimates manual torque based upon the acquired encoder value and the motor output current (S3). The manual torque is torque inputted from the outside such as, for example, torque inputted to the wheel 2 by rotating the hand rim 13 by an occupant of the wheelchair 1. The manual torque is not limited thereto, and for example, the manual torque may be torque inputted to the wheel 2 by pressing the hand grip 7 by a helper, may be torque inputted to the wheel 2 by kicking the floor by the occupant, and may be torque inputted to the wheel 2 by directly rotating the wheel 2 by the occupant.

Next, the controller 30 executes a target current determination routine that determines a motor target current based upon the estimated manual torque (S4). The motor target current is a target current of the electric motor 21, and is a current amount of the electric motor 21 which is set as the target of the controller 30.

The controller 30 repeats steps S2 to S4 while a power supply state is ON (S5: YES). When the power supply state is OFF (S5: NO), the controller 30 terminates the process.

Hereinafter, specific examples of the manual torque estimation routine S3 and the target current determination routine S4 will be described. In the first to third control examples described hereinbelow, estimation methods of the manual torque are different from each other.

First Control Example

Figure 5:
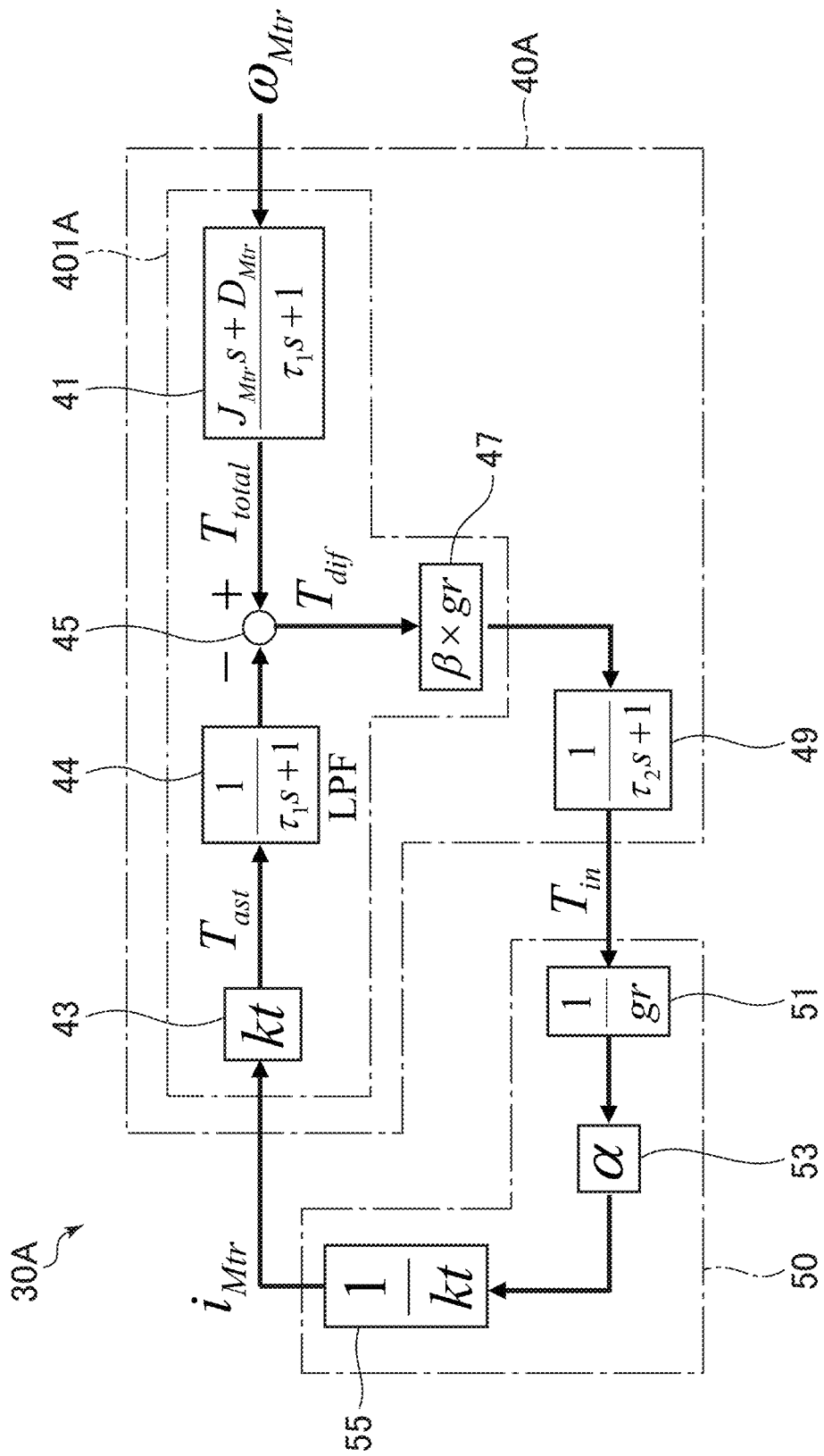
FIG. 5 is a block diagram illustrating a functional configuration of a control device according to a first control example.

FIG. 5 is a block diagram illustrating a functional configuration of the controller 30 (hereinafter also referred to as a controller 30A) according to a first control example. Each function block is implemented in such a manner that the microprocessor included in the controller 30 executes the processes according to the program stored in the storage.

The controller 30A includes a manual torque estimator (hereinafter also referred to as a manual torque estimator 40A) and a target current determiner 50 according to the first control example. The manual torque estimator 40 executes the manual torque estimation routine S3, and the target current determiner 50 executes the target current determination routine S4. The manual torque estimator 40 is an example of a manual torque value calculator.

The manual torque estimator 40A includes an angular velocity-torque converter 41, a motor current-torque converter 43, a low pass filter 44, a subtraction calculator 45, a wheel torque converter 47, and a low pass filter 49.

The angular velocity-torque converter 41 is an example of a total torque value calculator, and calculates a total torque value $T_{total}$ based upon the detection signal of the encoder 24. Specifically, the angular velocity-torque converter 41 converts a motor angular velocity $\omega_{Mtr}$ calculated from the encoder value into the total torque value $T_{total}$. The total torque value $T_{total}$ is calculated as a torque acting on the electric motor 21. The total torque value $T_{total}$ calculated by the angular velocity-torque converter 41 is outputted to the subtraction calculator 45.

The total torque includes the manual torque inputted from the outside and the assist torque outputted from the electric motor 21. Since the wheel 2 and the electric motor 21 integrally rotate, the detection signal of the encoder 24 that detects the rotation of the electric motor 21 represents the rotation by the total torque acting on the wheel 2 (that is, the sum of the manual torque inputted from the outside and the assist torque outputted from the electric motor 21).

Among the equations multiplied in the motor angular velocity $\omega_{Mtr}$ in the angular velocity-torque converter 41, $\tau$ is a time constant of the low pass filter, s is a Laplace operator, $J_{Mtr}$ is an inertia moment of the electric motor 21, and $D_{Mtr}$ is a viscosity coefficient of the electric motor 21. The denominator of the equation is a component of the low pass filter, and the numerator thereof is a component that converts angular velocity into torque.

The angular velocity-torque converter 41 calculates the total torque value $T_{total}$ based upon "only" the detection signal of the encoder 24. The meaning of based upon "only" the detection signal of the encoder 24 indicates that no detection signal other than the detection signal of the encoder 24 is used among the detection signals inputted to the controller 30. For example, even though an acceleration sensor is provided and a detection signal of the acceleration sensor is inputted to the controller 30, the detection signal of the acceleration sensor is not used for the calculation of the total torque value $T_{total}$.

The motor current-torque converter 43 is an example of an assist torque value calculator, and calculates an assist torque value $T_{ast}$ based upon a motor output current $i_{Mtr}$. The assist torque is a torque outputted from the electric motor 21. Specifically, the motor current-torque converter 43 calculates the assist torque value $T_{ast}$ by multiplying the motor output current $i_{Mtr}$ by a motor torque constant kt. The assist torque value $T_{ast}$ is calculated as a torque acting on the electric motor 21.

The assist torque value $T_{ast}$ calculated by the motor current-torque converter 43 is outputted to the subtraction calculator 45 via the low pass filter 44.

The subtraction calculator 45 calculates a difference $T_{dif}$ between the total torque value $T_{total}$ from the angular velocity-torque converter 41 and the assist torque value $T_{ast}$ from the motor current-torque converter 43. Specifically, the subtraction calculator 45 calculates the difference $T_{dif}$ by subtracting the assist torque value $T_{ast}$ from the total torque value $T_{total}$.

The difference $T_{dif}$ calculated by the subtraction calculator 45 is converted from the torque acting on the electric motor 21 into the torque acting on the wheel 2 by the wheel torque converter 47, and then is further outputted to the target current determiner 50 as a manual torque value $T_{in}$ via the low pass filter 49. That is, the manual torque value $T_{in}$ is calculated as the torque acting on the wheel 2.

In the wheel torque converter 47, $\beta$ to be multiplied by the difference $T_{dif}$ is transmission efficiency from the electric motor 21 to the wheel 2, and gr is a deceleration ratio of the electric motor 21 to the wheel 2.

The target current determiner 50 includes a motor torque converter 51, an assist ratio multiplication calculator 53, and a torque-motor current converter 55.

The motor torque converter 51 divides the manual torque value $T_{in}$ from the manual torque estimator 40A by the deceleration ratio gr, thus converting the manual torque value $T_{in}$ from the torque acting on the wheel 2 into the torque acting on the electric motor 21. The converted manual torque value $T_{in}$ is outputted to the assist ratio multiplication calculator 53.

The assist ratio multiplication calculator 53 multiplies the manual torque value $T_{in}$ converted into the torque acting on the electric motor 21 by a predetermined assist ratio $\alpha$. The assist ratio $\alpha$ is, for example, a value which is greater than 0 and equal to or smaller than 2, for example. Further, the assist ratio $\alpha$ may be changed according to a vehicle speed of the wheelchair 1 calculated from the detection signal of the encoder 24.

The torque-motor current converter 55 calculates the target current of the electric motor 21 based upon the manual torque value $T_{in}$ multiplied by the assist ratio $\alpha$. Specifically, the torque-motor current converter 55 calculates the target current of the electric motor 21 by dividing the manual torque value $T_{in}$ multiplied by the assist ratio by the motor torque constant kt.

The controller 30 controls a current outputted to the electric motor 21 so that the target current flows. The current outputted from the controller 30 to the electric motor 21 is detected as the motor output current $i_{Mtr}$, and is used to calculate the assist torque value $T_{ast}$ by the motor current-torque converter 43.

Figure 6:
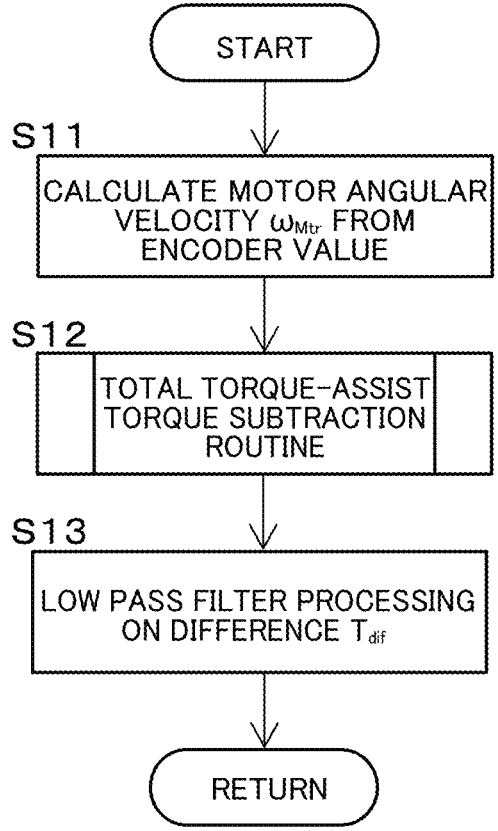
FIG. 6 is a flowchart illustrating a manual torque estimation routine according to the first control example.
Figure 7:
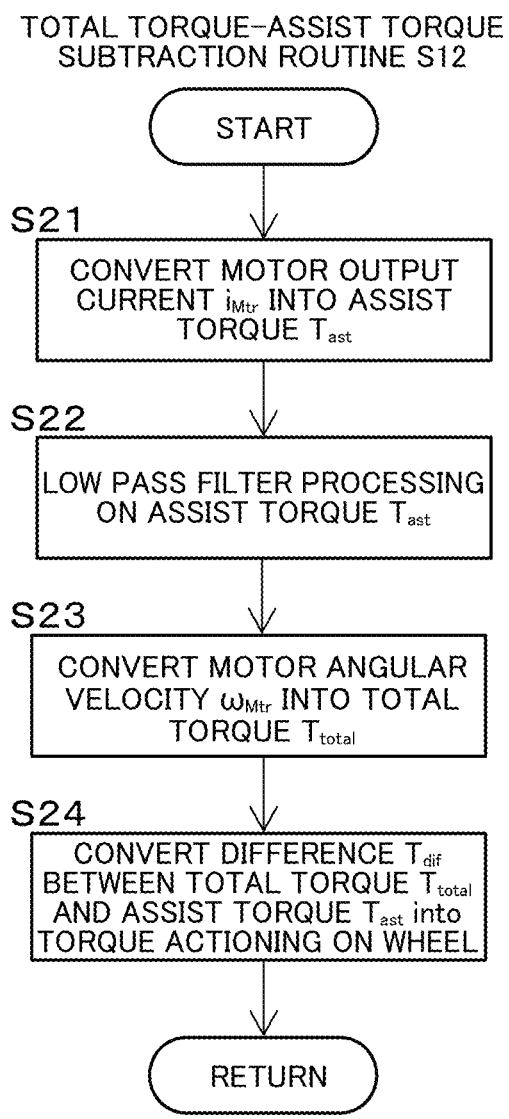
FIG. 7 is a flowchart illustrating a routine included in the manual torque estimation routine.

FIG. 6 is a flowchart illustrating a manual torque estimation routine (hereinafter also referred to as a manual torque estimation routine S6A) according to the first control example. FIG. 7 is a flowchart illustrating a total torque-assist torque subtraction routine S12 included in the manual torque estimation routine S6A.

In the manual torque estimation routine S6A illustrated in FIG. 6, the controller 30A first calculates the motor angular velocity $\omega_{Mtr}$ from the encoder value (S11). Next, the controller 30A executes the total torque-assist torque subtraction routine S12. The total torque-assist torque subtraction routine S12 is executed in a block group 401A of the controller 30A illustrated in FIG. 5.

In the total torque-assist torque subtraction routine S12 illustrated in FIG. 7, the controller 30A first converts the motor output current $i_{Mtr}$ into the assist torque value $T_{ast}$ (S21: operation as the motor current-torque converter 43). Next, the controller 30A performs low pass filter processing on the assist torque value $T_{ast}$ (S22: operation as the low pass filter 44).

Next, the controller 30A converts the motor angular velocity mat, into the total torque value $T_{total}$ (S23: operation as the angular velocity-torque converter 41). Next, the controller 30A calculates the difference $T_{dif}$ between the total torque value $T_{total}$ and the assist torque value $T_{ast}$, and converts the difference $T_{dif}$ into the torque acting on the wheel 2 (S24: operation as the subtraction calculator 45 and the wheel torque converter 47).

Referring back to FIG. 6, the controller 30A performs the low pass filter processing on the difference $T_{dif}$ calculated as the torque acting on the wheel 2 (S13: operation as the low pass filter 49). The difference $T_{dif}$ calculated in this manner is outputted as the manual torque value $T_{in}$, and the manual torque estimation routine S6A is terminated.

In the first control example described above, since the total torque value $T_{total}$ is calculated based upon "only" the detection signal of the encoder 24 and then the manual torque value $T_{in}$ is calculated by using the total torque value $T_{total}$, it is possible to estimate the manual torque with a simple hardware configuration. This is particularly advantageous for the power assist unit 10 for the wheelchair that is attachable to and detachable from the vehicle body frame 3.

On the other hand, since estimating the manual torque by using an acceleration sensor or a gyro sensor has a problem in that a detected value changes depending on a sensor mounting position, the estimation is not particularly appropriate for a unit attachable to and detachable from various wheelchairs. That is, since it is desirable to set a sensor mounting position at the center of the wheelchair but the center of the wheelchair is different depending on the type of the wheelchair, it is difficult to always match the sensor mounting position with the center of the wheelchair.

Second Control Example

Figure 8:
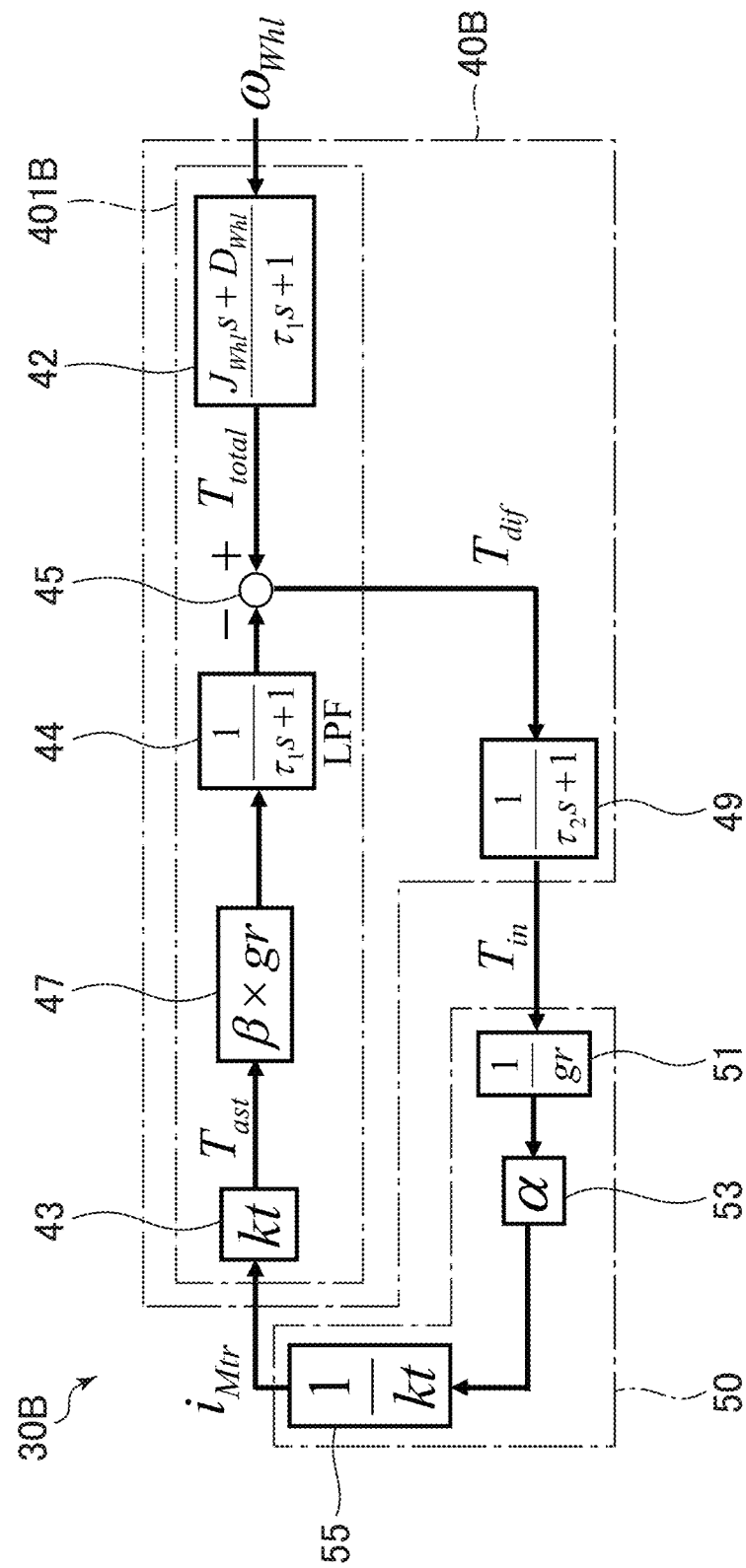
FIG. 8 is a block diagram illustrating a functional configuration of a control device according to a second control example.

FIG. 8 is a block diagram illustrating a functional configuration of the controller 30 (hereinafter also referred to as a controller 30B) according to a second control example. A detailed description of a configuration that overlaps with the above-described control example will be omitted by adding the same number thereto.

The controller 30B includes the manual torque estimator 40 (hereinafter also referred to as a manual torque estimator 40B) and the target current determiner 50 according to the second control example. The manual torque estimator 40B includes an angular velocity-torque converter 42, the motor current-torque converter 43, the wheel torque converter 47, the low pass filter 44, the subtraction calculator 45, and the low pass filter 49.

The angular velocity-torque converter 42 is an example of a total torque value calculator, and calculates the total torque value $T_{total}$ based upon the detection signal of the encoder 24. Specifically, the angular velocity-torque converter 42 converts the wheel angular velocity $\omega_{Whl}$ calculated from the encoder value into the total torque value $T_{total}$. The wheel angular velocity $\omega_{Whl}$ is obtained by dividing the motor angular velocity $\omega$Mtr calculated from the encoder value by the deceleration ratio of the electric motor 21 to the wheel 2. The total torque value $T_{total}$ is calculated as the torque acting on the wheel 2.

Among the equations multiplied in the wheel angular velocity $\omega_{Whl}$ in the angular velocity-torque converter 42, $J_{Whl}$ is an inertia moment of the wheel 2, and $D_{Whl}$ is a viscosity coefficient of the wheel 2.

The angular velocity-torque converter 42 of the example also calculates the total torque value $T_{total}$ based upon "only" the detection signal of the encoder 24.

The assist torque value $T_{ast}$ calculated by the motor current-torque converter 43 is converted from the torque acting on the electric motor 21 into the torque acting on the wheel 2 by the wheel torque converter 47, and is further outputted to the subtraction calculator 45 via the low pass filter 44.

The difference $T_{dif}$ calculated by the subtraction calculator 45 is outputted to the target current determiner 50 as the manual torque $T_{in}$ via the low pass filter 49. That is, the manual torque $T_{in}$ is calculated as the torque acting on the wheel 2.

Figure 9:
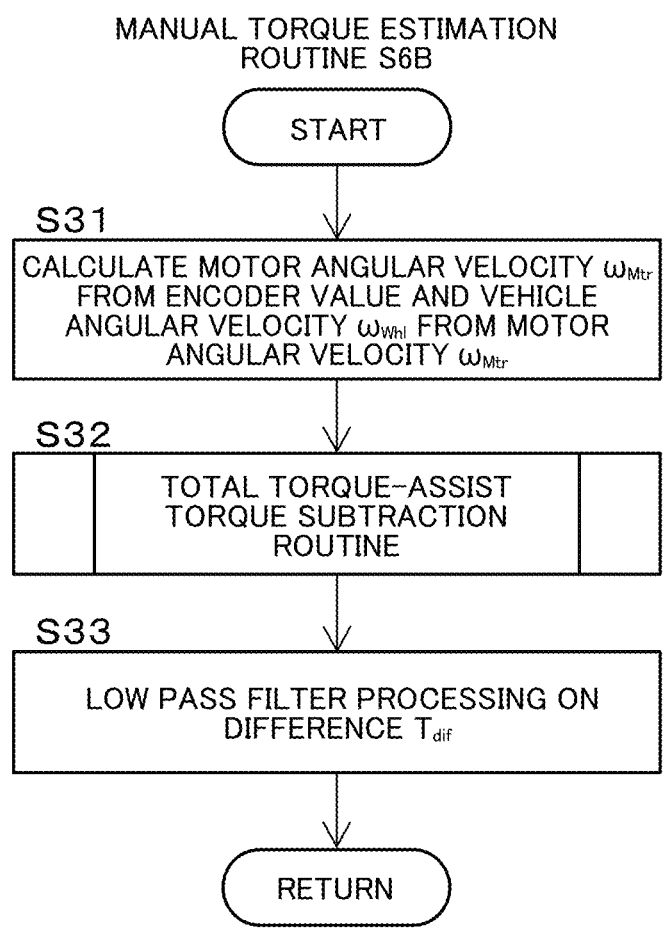
FIG. 9 is a flowchart illustrating a manual torque estimation routine according to the second control example.
Figure 10:
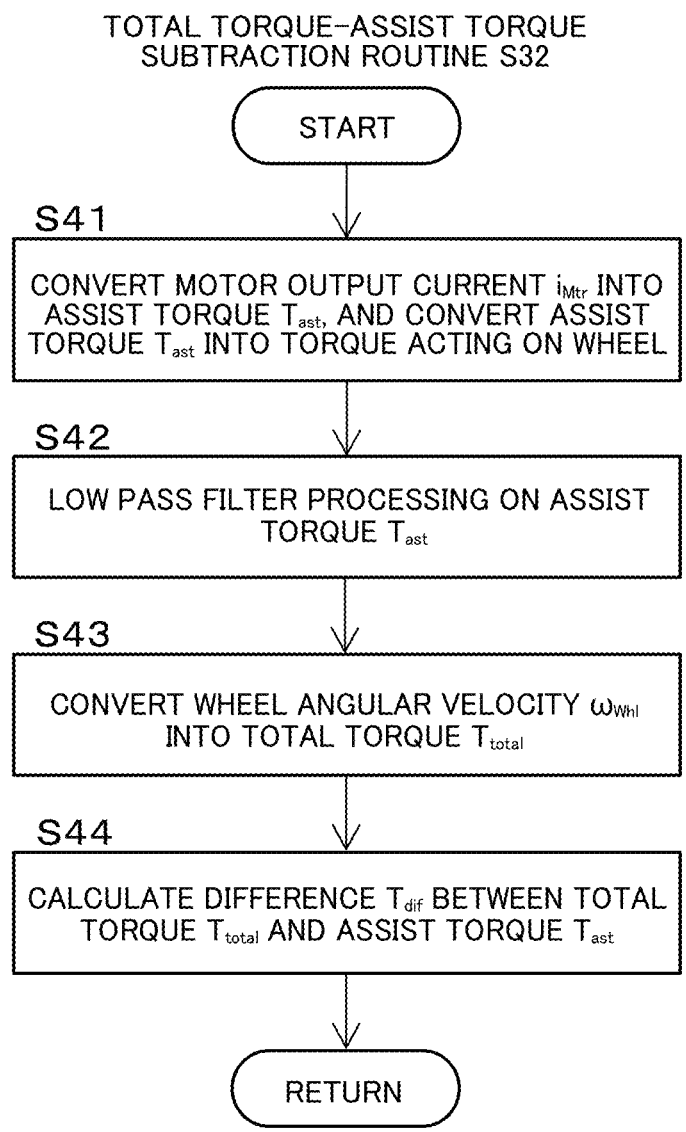
FIG. 10 is a flowchart illustrating a routine included in the manual torque estimation routine.

FIG. 9 is a flowchart illustrating the manual torque estimation routine (hereinafter also referred to as a manual torque estimation routine S6B) according to the second control example. FIG. 10 is a flowchart illustrating a total torque-assist torque subtraction routine S32 included in the manual torque estimation routine S6B.

In the manual torque estimation routine S6B illustrated in FIG. 9, the controller 30B first calculates the motor angular velocity $\omega_{Mtr}$ from the encoder value, and calculates the wheel angular velocity $\omega_{Whl}$ from the motor angular velocity $\omega_{Mtr}$ (S31). In this example, as described above, the wheel angular velocity $\omega_{Whl}$ is a value obtained by dividing the motor angular velocity $\omega$Mtr by the deceleration ratio.

Next, the controller 30B executes the total torque-assist torque subtraction routine S32. The total torque-assist torque subtraction routine S32 is executed in a block group 401B of the controller 30B illustrated in FIG. 8.

In the total torque-assist torque subtraction routine S32 illustrated in FIG. 10, the controller 30B first converts the motor output current $i_{Mtr}$ into the assist torque value $T_{ast}$, and converts the assist torque value $T_{ast}$ into the torque acting on the wheel 2 (S41: operation as the motor current-torque converter 43 and the wheel torque converter 47). Next, the controller 30B performs the low pass filter processing on the assist torque value $T_{ast}$ (S42: operation as the low pass filter 44).

Next, the controller 30B converts the wheel angular velocity $\omega_{Whl}$ into the total torque value $T_{total}$ (S43: operation as the angular velocity-torque converter 42). Next, the controller 30B calculates the difference $T_{dif}$ between the total torque value $T_{total}$ and the assist torque value $T_{ast}$ (S44: operation as the subtraction calculator 45).

Referring back to FIG. 9, the controller 30B performs the low pass filter processing on the difference $T_{dif}$ (S33: operation as the low pass filter 49). The difference $T_{dif}$ calculated in this manner is outputted as the manual torque value $T_{in}$, and the manual torque estimation routine S6B is terminated.

Also, in the second control example described above, in the same manner as that of the first control example, since the total torque value $T_{total}$ is calculated based upon "only" the detection signal of the encoder 24 and then the manual torque value $T_{in}$ is calculated by using the total torque value $T_{total}$, it is possible to estimate the manual torque with a simple hardware configuration.

Third Control Example

In the wheelchair 1, actually, the wheel 2 may twist with respect to the axle. Specifically, a phase of the outer ring side of the wheel 2 and the axle side thereof may be deviated by elastic deformation of a member between the outer periphery of the wheel 2 and the axle thereof. For example, the spoke 27 between the outer peripheral portion 26 of the wheel 2 and the hub 25 illustrated in FIG. 1 is mainly elastically deformed. Therefore, in this example, the manual torque is estimated in consideration of such a twist.

Figure 11:
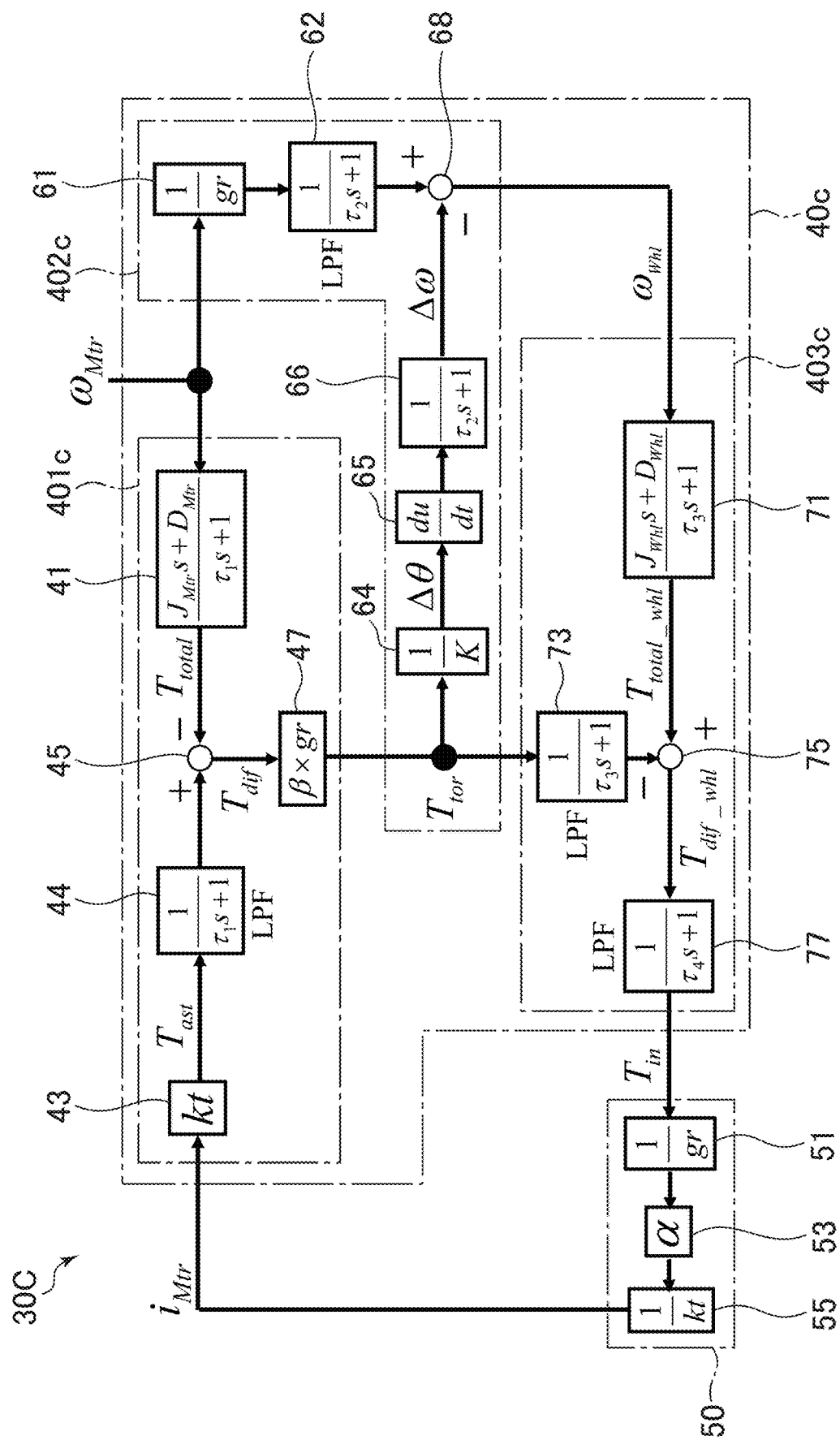
FIG. 11 is a block diagram illustrating a functional configuration of a control device according to a third control example.

FIG. 11 is a block diagram illustrating a functional configuration of the controller 30 (hereinafter also referred to as a controller 30C) according to a third control example. A detailed description of a configuration that overlaps with the above-described control example will be omitted by adding the same number thereto. The controller 30C includes the manual torque estimator 40 (hereinafter also referred to as a manual torque estimator 40C) and the target current determiner 50 according to the third control example.

The manual torque estimator 40C includes a block group 401C that calculates a twist torque value $T_{tor}$ that causes a twist; a block group 402C that calculates the wheel angular velocity $\omega_{Whl}$ based upon the twist torque value $T_{tor}$; and a block group 403C that calculates the manual torque value $T_{in}$.

The block group 401C that calculates the twist torque value $T_{tor}$ is an example of a twist torque value calculator. Since the block group 401C is common to the block group 401A in the first control example, a detailed description thereof will be omitted. In this example, the difference $T_{dif}$ converted into the torque acting on the wheel 2 (the difference between the total torque value $T_{total}$ calculated based upon the motor angular velocity $\omega_{Mtr}$ and the assist torque value $T_{ast}$ calculated based upon the motor output current $i_{Mtr}$) is outputted as the twist torque value $T_{tor}$.

The block group 402C that calculates the wheel angular velocity $\omega_{Whl}$ includes a wheel angular velocity converter 61, a low pass filter 62, a twist angle converter 64, a twist angular velocity converter 65, a low pass filter 66, and a subtraction calculator 68.

The wheel angular velocity converter 61 converts the motor angular velocity $\omega_{Mtr}$ into the angular velocity of the wheel 2 by dividing the motor angular velocity (OMtr calculated from the encoder value by the deceleration ratio gr of the electric motor 21 to the wheel 2. The motor angular velocity $\omega_{Mtr}$ converted into the angular velocity of the wheel 2 is outputted to the subtraction calculator 68 via the low pass filter 62.

The twist angle converter 64 calculates a twist angle $\Delta\theta$ based upon the twist torque value $T_{tor}$. The twist angle $\Delta\theta$ is calculated by dividing the twist torque value $T_{tor}$ by a twist spring constant K. The twist angle $\Delta\theta$ represents an angle difference with respect to the axle of the wheel 2. That is, the twist angle $\Delta\theta$ is an angle difference generated between the axle side and the outer ring side by the twist torque acting on the axle side of the wheel 2.

The twist angular velocity converter 65 calculates a twist angular velocity $\Delta\omega$ based upon the twist angle $\Delta\theta$. The twist angular velocity $\Delta\omega$ is calculated by time-differentiating the twist angle $\Delta\theta$. The twist angular velocity $\Delta\omega$ is an angular velocity difference generated between the axle side and the outer ring side by the twist torque acting on the axle side of the wheel 2. The twist angular velocity $\Delta\omega$ is outputted to the subtraction calculator 68 via the low pass filter 66.

The subtraction calculator 68 outputs a difference obtained by subtracting the twist angular velocity $\Delta\omega$ from the motor angular velocity $\omega_{Mtr}$ converted into the angular velocity of the wheel 2 as the wheel angular velocity $\omega_{Whl}$. Thus, the wheel angular velocity $\omega_{Whl}$ closer to an actual value in consideration of the twist is obtained, and the obtained wheel angular velocity $\omega_{Whl}$ is used for estimating the manual torque.

The block group 403C that calculates the manual torque value $T_{in}$ includes an angular velocity-torque converter 71, a low pass filter 73, a subtraction calculator 75, and a low pass filter 77.

The angular velocity-torque converter 71 is an example of a total torque value calculator, and calculates a total torque value $T_{total\_whl}$. Specifically, the angular velocity-torque converter 71 converts the wheel angular velocity $\omega_{Whl}$ in consideration of the twist from the block group 402C (that is, the difference obtained by subtracting the twist angular velocity $\Delta\omega$ from the motor angular velocity $\omega_{Mtr}$ converted into the angular velocity of the wheel 2) into the total torque value $T_{total\_whl}$. The total torque value $T_{total\_whl}$ calculated by the angular velocity-torque converter 71 is outputted to the subtraction calculator 75.

On the other hand, the twist torque value $T_{tor}$ from the block group 401C is outputted to the subtraction calculator 75 via the low pass filter 73.

The subtraction calculator 75 calculates a difference $T_{dif\_whl}$ between the total torque value $T_{total\_whl}$ from the angular velocity-torque converter 71 and the twist torque value $T_{tor}$ from the low pass filter 73. Specifically, the subtraction calculator 75 calculates the difference $T_{dif\_whl}$ by subtracting the twist torque value $T_{tor}$ from the total torque value $T_{total\_whl}$. The difference $T_{dif\_whl}$ calculated by the subtraction calculator 75 is outputted to the target current determiner 50 as the manual torque value $T_{in}$ via the low pass filter 77.

Figure 12:
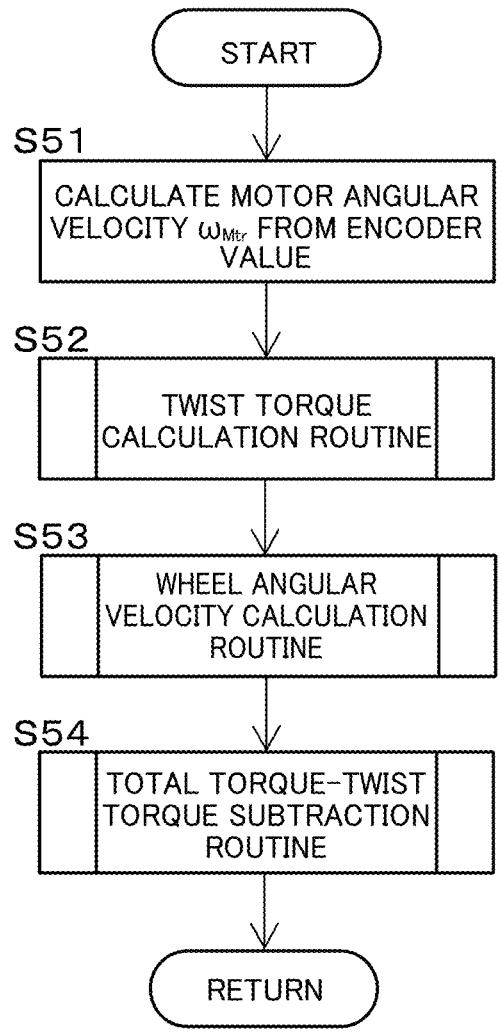
FIG. 12 is a flowchart illustrating a manual torque estimation routine according to the third control example.
Figure 13:
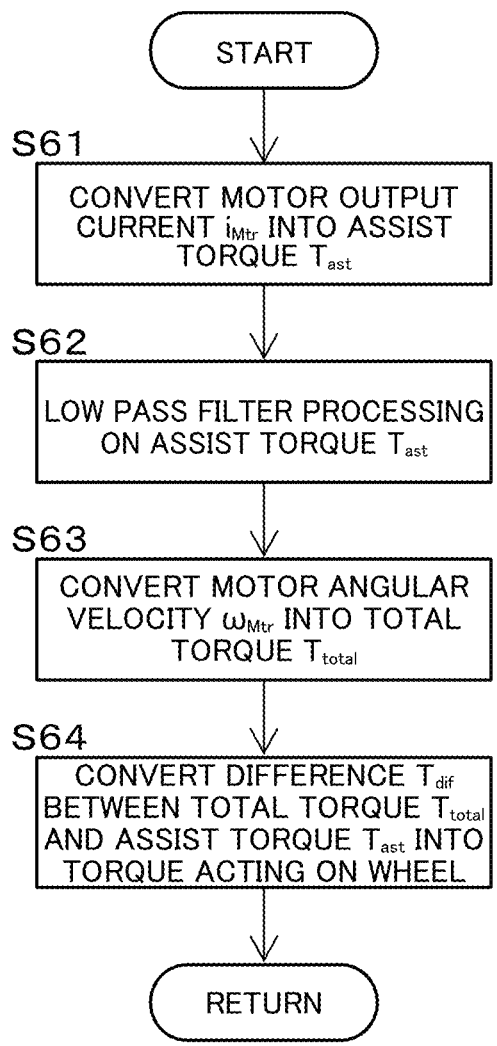
FIG. 13 is a flowchart illustrating a routine included in the manual torque estimation routine.
Figure 14:
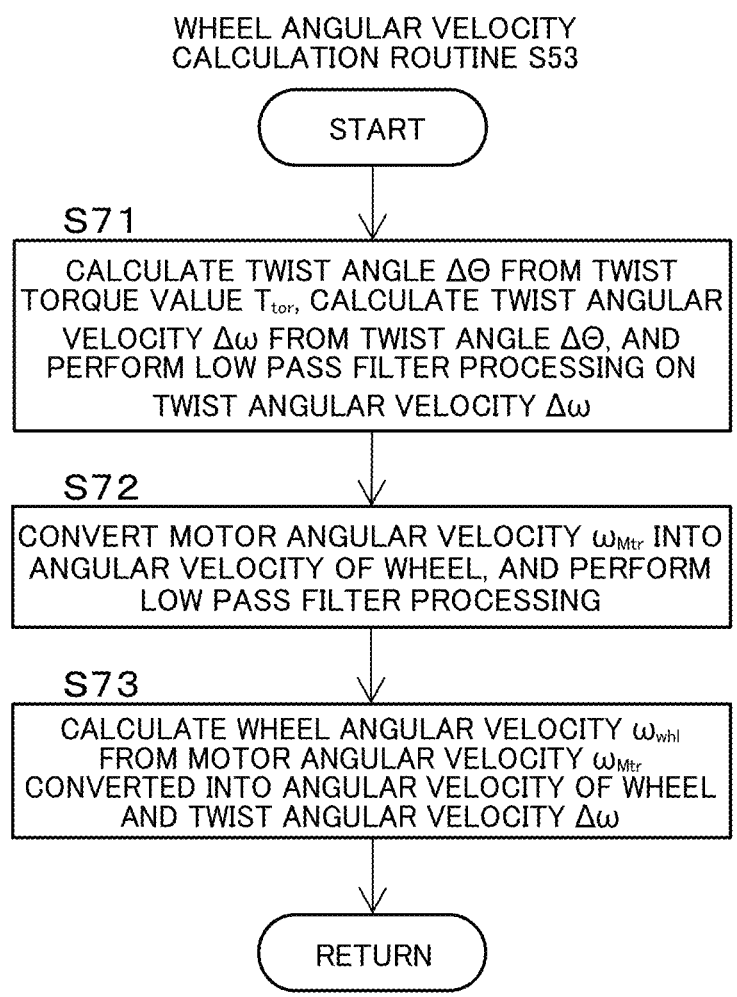
FIG. 14 is a flowchart illustrating a routine included in the manual torque estimation routine.
Figure 15:
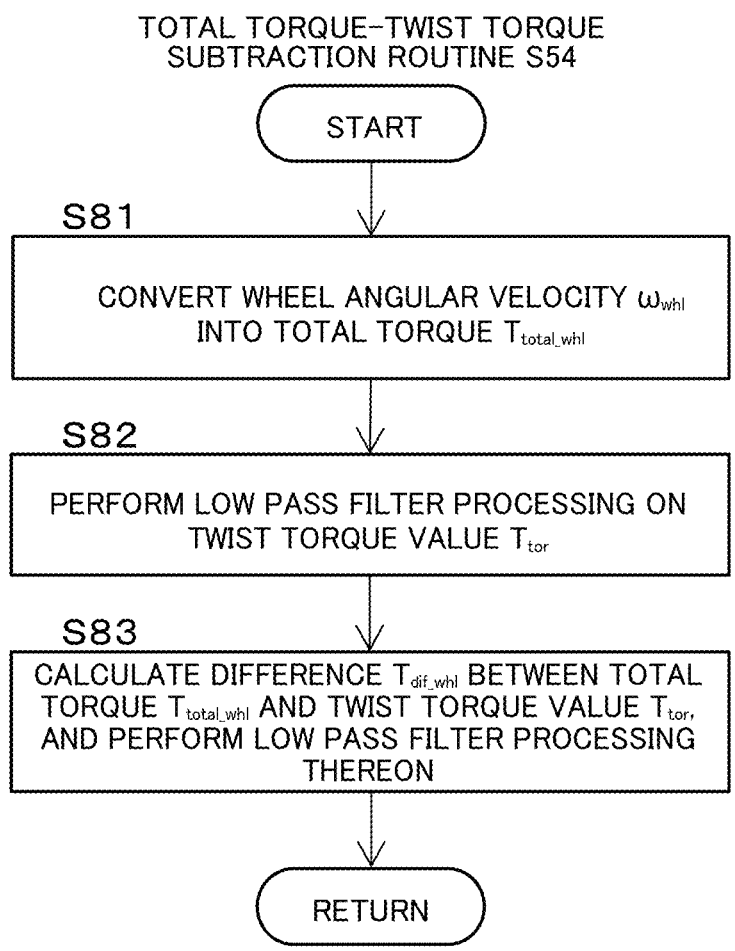
FIG. 15 is a flowchart illustrating a routine included in the manual torque estimation routine.

FIG. 12 is a flowchart illustrating the manual torque estimation routine (hereinafter also referred to as a manual torque estimation routine S6C) according to the third control example. FIGS. 13 to 15 are flowcharts illustrating a twist torque calculation routine S52, a wheel angular velocity calculation routine S53, and a total torque-twist torque subtraction routine S53 included in the manual torque estimation routine S6C.

In the manual torque estimation routine S6C illustrated in FIG. 12, the controller 30C first calculates the motor angular velocity $\omega_{Mtr}$ from the encoder value (S51). Next, the controller 30C executes the twist torque calculation routine S52. The twist torque calculation routine S52 is executed in the block group 401C of the controller 30C illustrated in FIG. 11.

In the twist torque calculation routine S52 illustrated in FIG. 13, the controller 30C first converts the motor output current $i_{Mtr}$ into the assist torque value $T_{ast}$ (S61: operation as the motor current-torque converter 43). Next, the controller 30C performs the low pass filter processing on the assist torque value $T_{ast}$ (S62: operation as the low pass filter 44).

Next, the controller 30C converts the motor angular velocity $\omega_{Mtr}$ into the total torque value $T_{total}$ (S63: operation as the angular velocity-torque converter 41). Next, the controller 30C calculates the difference $T_{dif}$ between the total torque value $T_{total}$ and the assist torque value $T_{ast}$, and converts the difference $T_{dif}$ into the torque acting on the wheel 2 (S64: operations as the subtraction calculator 45 and the wheel torque converter 47).

The difference $T_{dif}$ converted into the torque acting on the wheel 2 (the difference between the total torque value $T_{total}$ calculated based upon the motor angular velocity $\omega_{Mtr}$ and the assist torque value $T_{ast}$ calculated based on the motor output current $i_{Mtr}$) is outputted as the twist torque value $T_{tor}$.

Next, in the manual torque estimation routine S6C illustrated in FIG. 12, the controller 30C executes the wheel angular velocity calculation routine S53. The wheel angular velocity calculation routine S53 is executed in the block group 402C of the controller 30C illustrated in FIG. 11.

In the wheel angular velocity calculation routine S53 illustrated in FIG. 14, the controller 30C first calculates the twist angle $\Delta\theta$ from the twist torque value $T_{tor}$, calculates the twist angular velocity $\Delta\omega$ from the twist angle $\Delta\theta$, and performs the low pass filter processing on the twist angular velocity $\Delta\omega$ (S71: operations as the twist angle converter 64, the twist angular velocity converter 65, and the low pass filter 66).

Next, the controller 30C converts the motor angular velocity $\omega_{Mtr}$ into the angular velocity of the wheel 2 and performs the low pass filter processing (S72: operation as the wheel angular velocity converter 61 and the low pass filter 62). Next, the controller 30C calculates the wheel angular velocity $\omega_{whl}$ from the motor angular velocity $\omega_{Mtr}$ converted into the angular velocity of the wheel 2 and the twist angular velocity $\Delta\omega$ (S73: operation as the subtraction calculator 68).

Next, in the manual torque estimation routine S6C illustrated in FIG. 12, the controller 30C executes the total torque-twist torque subtraction routine S54. The total torque-twist torque subtraction routine S54 is executed in the block group 403C of the controller 30C illustrated in FIG. 11.

In the total torque-twist torque subtraction routine S54 illustrated in FIG. 15, the controller 30C first converts the wheel angular velocity $\omega_{whl}$ into the total torque value $T_{total\_whl}$ (S81: operation as the angular velocity-torque converter 71). Next, the controller 30C performs the low pass filter processing on the twist torque value $T_{tor}$ (S82: operation as the low pass filter 73).

Next, the controller 30C calculates the difference $T_{dif\_whl}$ between the total torque value $T_{total\_whl}$ and the twist torque value $T_{tor}$, and performs the low pass filter processing on the difference $T_{dif\_whl}$ (S83: operation as the subtraction calculator 75 and the low pass filter 77). The difference $T_{dif\_whl}$ calculated in this manner is outputted as the manual torque value $T_{in}$, and the manual torque estimation routine S6C is terminated.

In the third control example described above, since the twist torque value $T_{tor}$ is calculated and then the manual torque value $T_{in}$ is calculated by using the twist torque value $T_{tor}$, it is possible to estimate the manual torque in consideration of the twist.

Further, in the third control example, the difference obtained by subtracting the twist angular velocity $\Delta\omega$ from the motor angular velocity $\omega_{Mtr}$ converted into the angular velocity of the wheel 2 is defined as the wheel angular velocity $\omega_{Whl}$, and the total torque value $T_{total\_whl}$ is calculated from the wheel angular velocity $\omega_{Whl}$. Accordingly, it is possible to calculate the total torque value $T_{total\_whl}$ more accurately.

Further, in the third control example, the twist angular velocity $\Delta\omega$ is calculated based upon the twist torque value $T_{tor}$. Thus, it is possible to use the twist torque value $T_{tor}$ not only for calculating the wheel angular velocity $\omega_{Whl}$ by the block group 402C and but also for calculating the manual torque value $T_{in}$ by the block group 403C.

Figure 16:
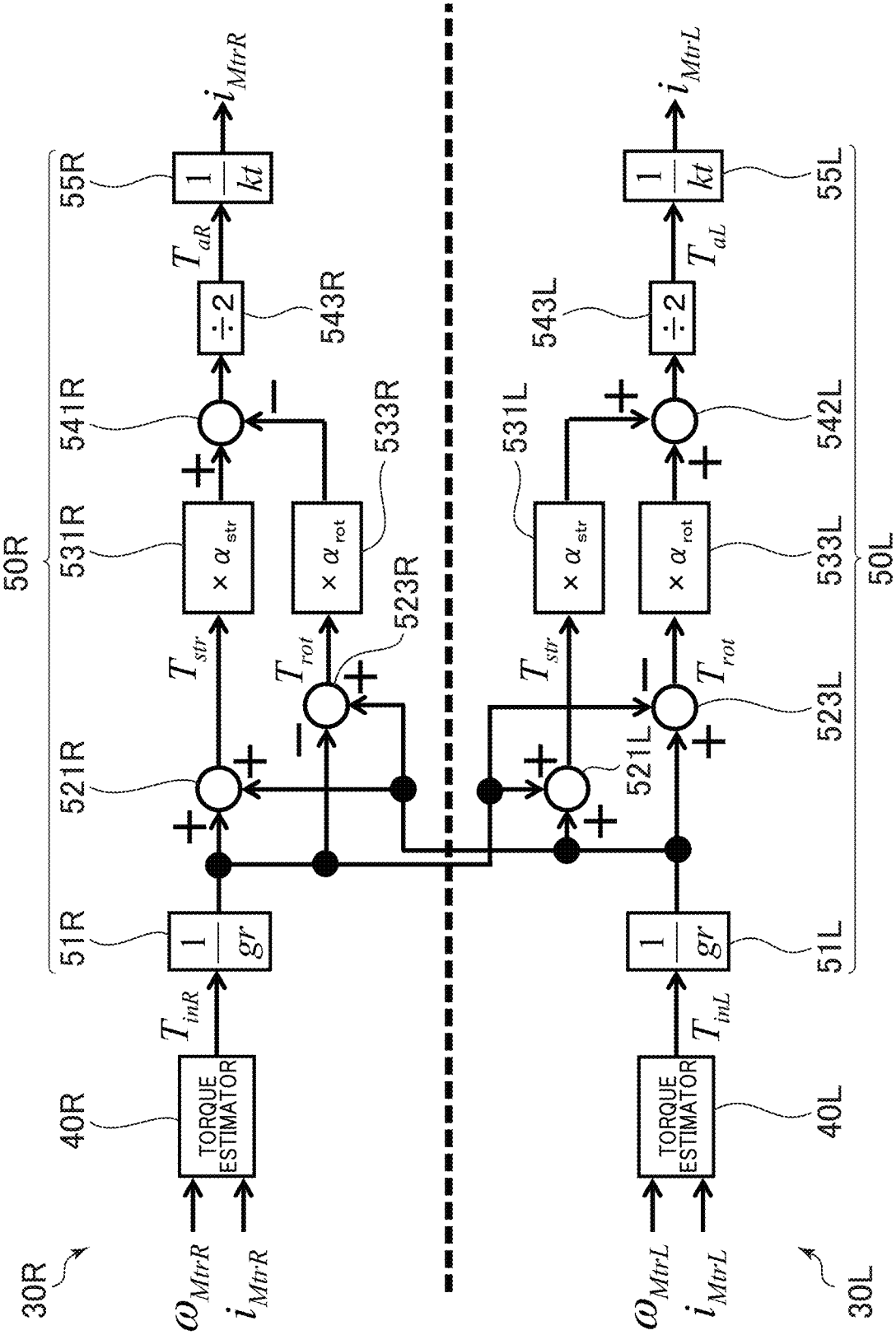
FIG. 16 is a block diagram illustrating a functional configuration of a control device according to another preferred embodiment of the present invention.

FIG. 16 is a block diagram illustrating a functional configuration of a control device according to another preferred embodiment of the present invention. In the present preferred embodiment, the controllers 30R and 30L respectively determine motor output currents $i_{MtrR}$ and $i_{MtrL}$ while transmitting and receiving information to and from each other.

The right controller 30R includes a manual torque estimator 40R and a target current determiner 50R. The manual torque estimator 40R calculates a manual torque value $T_{inR}$ of the right wheel 2R based upon a motor angular velocity $\omega_{MtrR}$ of the right electric motor 21R and a motor output current $\omega_{MtrR}$ thereof. The target current determiner 50R determines the motor output current $i_{MtrR}$ to be outputted to the right electric motor 21R based upon the manual torque value $T_{inR}$ from the manual torque estimator 40R and a manual torque value $T_{inL}$ from the left controller 30L.

In the same manner, the left controller 30L includes a manual torque estimator 40L and a target current determiner 50L. The manual torque estimator 40L calculates the manual torque value $T_{inL}$ of the left wheel 2L based upon a motor angular velocity $\omega_{MtrL}$ of the left electric motor 21L and a motor output current $i_{MtrL}$ thereof. The target current determiner 50L determines the motor output current $i_{MtrL}$ to be outputted to the left electric motor 21L based upon the manual torque value $T_{inL}$ from the manual torque estimator 40L and the manual torque value $T_{inR}$ from the right controller 30R.

One of the manual torque estimators 40A to 40C according to the first to third control examples can be applied to the manual torque estimators 40R and 40L.

The target current determiners 50R and 50L have the same configuration. Hereinafter, the target current determiner 50R of the right controller 30R will be representatively described, and the detailed description of the target current determiner 50L of the left controller 30L will be omitted.

The target current determiner 50R includes a motor torque converter 51R, an addition calculator 521R, a subtraction calculator 523R, a straight-ahead assist ratio multiplication calculator 531R, a turn assist ratio multiplication calculator 533R, a subtraction calculator 541R, a division calculator 543R, and a torque-motor current converter 55R.

The motor torque converter 51R converts the manual torque value $T_{inR}$ from the manual torque estimator 40R into the torque acting on the electric motor 21 from the torque acting on the wheel 2. The motor torque converter 51R outputs the converted manual torque value $T_{inR}$ to the addition calculator 521R, the subtraction calculator 523R, and the left controller 30L.

The addition calculator 521R calculates an additional manual torque value $T_{str}$ by adding the manual torque value $T_{inL}$ from the left controller 30L to the manual torque value $T_{inR}$ from the motor torque converter 51R, and the obtained value is outputted to the straight-ahead assist ratio multiplication calculator 531R. The additional manual torque value $T_{str}$ represents a straight-ahead component of the manual torque inputted to the wheels 2R and 2L of the wheelchair 1.

The subtraction calculator 523R calculates a subtraction manual torque value $T_{rot}$ by subtracting the manual torque value $T_{inR}$ from the motor torque converter 51R from the manual torque value $T_{inL}$ from the left controller 30L, and the obtained value is outputted to the turn assist ratio multiplication calculator 533R. The subtraction manual torque value $T_{rot}$ represents a turn component of the manual torque inputted to the wheels 2R and 2L of the wheelchair 1.

In the present preferred embodiment, since the clockwise rotation of the yaw axis is positive and the counterclockwise rotation thereof is negative, the manual torque value $T_{inR}$ of the right wheel 2R is subtracted from the manual torque value $T_{inL}$ of the left wheel 2L. The addition manual torque value $T_{str}$ and the subtraction manual torque value $T_{rot}$ are represented by the following Equation 1:

$$T_{str} = T_{inL} + T_{inR}$$

$$T_{rot} = T_{inL} - T_{inR} \qquad \text{Equation 1}$$

The straight-ahead assist ratio multiplication calculator 531R multiplies the additional manual torque value $T_{str}$ from the addition calculator 521R by a predetermined straight-ahead assist ratio $\alpha_{str}$, and outputs the obtained value to the subtraction calculator 541. The turn assist ratio multiplication calculator 533R multiplies the subtraction manual torque value $T_{rot}$ from the subtraction calculator 523R by a predetermined turn assist ratio $\alpha_{rot}$, and outputs the obtained value to the subtraction calculator 541.

The subtraction calculator 541R subtracts the value from the turn assist ratio multiplication calculator 533R from the value from the straight-ahead assist ratio multiplication calculator 531R, and outputs the obtained value to the division calculator 543R. The division calculator 543R divides the value from the subtraction calculator 541R by 2, and outputs the obtained value to the torque-motor current converter 55R as a right assist torque value $T_{\alpha R}$.

On the other hand, in the left controller 30L, an addition calculator 542L adds a value from a turn assist ratio multiplication calculator 533L to a value from a straight-ahead assist ratio multiplication calculator 531L, and outputs the obtained value to a division calculator 543L. The division calculator 543L divides the value from the addition calculator 542L by 2, and outputs the obtained value to a torque-motor current converter 55L as a left assist torque value $T_{\alpha L}$.

The right assist torque value $T_{\alpha R}$ and the left assist torque value $T_{\alpha L}$ obtained in this manner are represented by the following Equation 2:

$$T_{\alpha R} = \frac{\alpha_{str} T_{str} - \alpha_{rot} T_{rot}}{2}$$
$$T_{\alpha L} = \frac{\alpha_{str} T_{str} + \alpha_{rot} T_{rot}}{2}$$

Equation 2

The torque-motor current converter 55R calculates a target current $i_{MtrR}$ of the right electric motor 21R based upon the right assist torque value $T_{\alpha R}$ from the division calculator 543R. The right controller 30R controls the current to be outputted to the right electric motor 21R so that the target current $i_{MtrR}$ flows.

In the same manner, in the left controller 30L, the torque-motor current converter 55L calculates a target current $i_{MtrL}$ of the left electric motor 21L based upon the left assist torque value $T_{\alpha L}$ from the division calculator 543L. The left controller 30L controls the current to be outputted to the left electric motor 21L so that the target current $i_{MtrL}$ flows.

In the preferred embodiments described above, it is possible to control the straightness of driving the wheelchair 1 by the straight-ahead assist ratio $\alpha_{str}$, and it is possible to control the turnability of the wheelchair 1 by the turn assist ratio $\alpha_{rot}$. For example, it is possible to improve the straightness of driving the wheelchair 1 by making the straight-ahead assist ratio $\alpha_{str}$ greater than the turn assist ratio $\alpha_{rot}$. Further, it is possible to improve the turnability of the wheelchair 1 by making the turn assist ratio $\alpha_{rot}$ greater than the turn assist ratio $\alpha_{rot}$.

Hereinabove, preferred embodiments of the present invention have been described, but the present invention is not limited to the above-described preferred embodiments, and various modifications can be implemented by those skilled in the art.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A power assist wheelchair comprising:
a wheel;
an electric motor that drives the wheel;
an encoder that detects rotation of the electric motor; and
one or more processors to control the electric motor and configured or programmed to function as:
a total torque value calculator configured or programmed to calculate a total torque value based upon a detection signal of the encoder;
a twist torque value calculator configured or programmed to calculate a twist torque value representing torque causing twist of the wheel with respect to an axle;
a manual torque value calculator configured or programmed to calculate a manual torque value based upon a difference obtained by subtracting the twist torque value from the total torque value; and
a target current determiner configured or programmed to determine a target current of the electric motor based upon the manual torque value; wherein
the twist torque value calculator is configured or programmed to calculate the twist torque value based upon a difference obtained by subtracting a torque value calculated based upon the detection signal of the encoder from an assist torque value calculated based upon a current outputted to the electric motor.

2. The power assist wheelchair according to claim 1, wherein the total torque value calculator calculates the total torque value based upon a difference obtained by subtracting a twist angular velocity value representing an angular velocity of the twist from an angular velocity value calculated based upon the detection signal of the encoder.

3. The power assist wheelchair according to claim 2, wherein the twist angular velocity value is calculated based upon the twist torque value.

4. A control method for a power assist wheelchair including a wheel, an electric motor that drives the wheel, and an encoder that detects rotation of the electric motor, the method comprising:
calculating a total torque value based upon only a detection signal of the encoder;
calculating an assist torque value based upon a current outputted to the electric motor;
calculating a twist torque value based upon a difference obtained by subtracting a torque value calculated based upon the detection signal of the encoder from the assist torque value calculated based upon the current outputted to the electric motor;
calculating a manual torque value based upon a difference obtained by subtracting a torque value obtained from the twist torque value from a total wheel torque value obtained from the total torque value;
determining a target current of the electric motor based upon the manual torque value; and
controlling the electric motor based upon the target current of the electric motor.

* * * * *